Aug. 6, 1957 L. W. FROST ET AL 2,802,017
DOUBLE SUBSTITUTED-ARYLMETHYL SILICON COMPOUNDS
Filed April 21, 1953
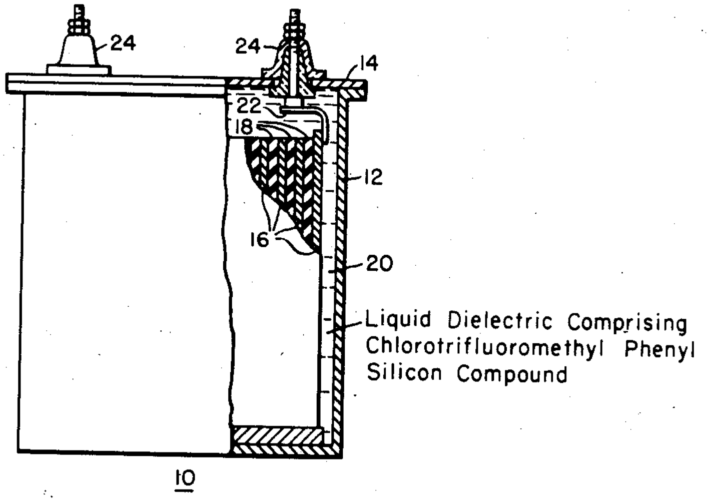
WITNESSES
Robert C. Baird
James F. Young
INVENTORS
Lawrence W. Frost, Gordon C. Gainer
and Daniel W. Lewis.
BY
Frederick Shapoe
ATTORNEY

United States Patent Office 2,802,017

Patented Aug. 6, 1957

2,802,017

DOUBLE SUBSTITUTED-ARYLMETHYL SILICON COMPOUNDS

Lawrence W. Frost, Murrysville, Gordon C. Gainer, Turtle Creek, and Daniel W. Lewis, Pittsburgh, Pa., assignors to Westinghouse Electric Corporation, East Pittsburgh, Pa., a corporation of Pennsylvania Application April 21, 1953, Serial No. 350,258

7 Claims. (Cl. 260—448.2)

This invention relates to novel organosilicon compounds having both methyl and 4-chloro-3-(trifluoromethyl) phenyl groups attached to silicon. These compounds are particularly adapted for making capacitors and other electrical members requiring liquids having a high dielectric constant and low power factor.

The object of this invention is to provide for preparing liquid organosilicon compounds having both methyl and 4-chloro-3-(trifluoromethyl) phenyl groups attached to silicon.

Another object of the invention is to provide liquid silanes having both methyl and 4-chloro-3-(trifluoromethyl) phenyl groups attached to silicon.

Another object of the invention is to provide liquid organic disiloxanes and polysiloxanes having both methyl and 4-chloro-3-(trifluoromethyl) phenyl groups attached to silicon.

A still further object of the invention is to provide electrical members and particularly capacitors embodying liquid disiloxane, polysiloxane and silanes in which both methyl and 4-chloro-3-(trifluoromethyl) phenyl groups are attached to silicon.

Another object is to provide a capacitor dielectric composition comprising liquid disiloxanes, polysiloxanes and silanes having both methyl and 4-chloro-3-(trifluoromethyl) phenyl groups attached to silicon, and a stabilizer in combination therewith.

Other objects of the invention will in part be obvious and will in part appear hereinafter.

The single figure of the drawing is a view in elevation, partly broken, of a capacitor.

We have discovered that liquid organosilicon compounds having both methyl and 4-chloro-3-(trifluoromethyl) phenyl groups attached to silicon have unique characteristics in that they possess a high dielectric constant and very low dissipation or power factor. These compounds further have high thermal and chemical stability. For example, they may be exposed for long periods of time to elevated temperatures of 150° C. to 250° C. in contact with oxygen, without degradation, decomposition or other breakdown or deterioration. These compounds have been employed in capacitors wherein they have been subjected to high temperatures while under severe electrical stresses, and they have functioned satisfactorily for a longer time than any known dielectric composition under the same conditions.

The organosilicon compounds of this invention comprise the group

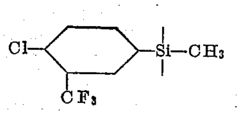

the remaining bonds on silicon being attached to methyl groups, 4-chloro-3-(trifluoromethyl) phenyl groups, and oxygen. These organosilicon compounds comprise silanes, disiloxanes and polysiloxanes. The silanes have the general formula

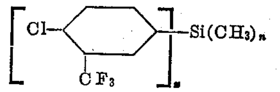

where $x$ is an integer having a value of from 1 to 2 and $n$ is an integer having a value of from 2 to 3, and the sum of X and $n$ is 4. The siloxanes may have the formula

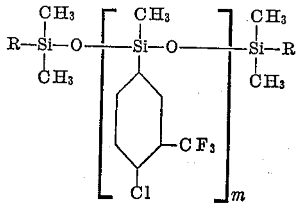

where $m$ has a whole values of at least 1 and R is an organic radical selected from the group consisting of methyl and 4-chloro-3-trifluoromethylphenyl radicals. As indicated, the polysiloxanes may include trimethylsilyl end-blocking groups.

The following examples illustrate the preparation of the various organosilicon compounds of the present invention:

*Example 1.—Preparation of 4-chloro-3-(trifluoromethyl) phenyltrimethylsilane*

A Grignard reaction was initiated between 24 grams of magnesium and a small quantity of 4-bromo-2-(trifluoromethyl) chlorobenzene dissolved in ether. When the reaction was well started, a mixture of 120 grams of trimethylchlorosilane, 1 liter of dry ether, and sufficient 4-bromo-2-(trifluoromethyl) chlorobenzene to make a total of 260 grams of this compound was added slowly to the initial reaction mixture. An exothermic reaction occurred, with the formation of a dark-colored solution. When the addition was complete, heat was applied, and the mixture was refluxed with stirring for 15 hours. A granular precipitate formed during the reflux period. Subsequently the liquid portion of the reacted product was poured into a mixture of ice and hydrochloric acid, and the organic layer was separated, washed with water, dried and distilled. There was obtained, in addition to low-boiling materials, 130 grams (52% yield) of crude 4-chloro-3-(trifluoromethyl) phenyltrimethylsilane. This material was rectified through a Podbielniak column to give a purified sample having the following properties:

| | |
|---|---|
| B. P. | 213.9° C. |
| M. P. | —32 to —34° C. |
| $n_D^{25}$ | 1.4663 |
| $d_4^{25}$ | 1.1664 |

*Analysis.*—Calculated for $C_{10}H_{12}SiClF_3$; Cl, 14.05; F, 22.6; Si, 11.07. Found: Cl, 14.1, 14.18; F, 22.3, 22.8; Si, 11.05, 10.89.

*Example 2.—Preparation of dimethylbis [4-chloro-3-(trifluoromethyl) phenyl]silane*

This compound was prepared by a procedure similar to that described in Example 1, using 38 grams of magnesium, 402 grams of 4-bromo-2-(trifluoromethyl)-chlorobenzene, 100 grams of dimethyldichlorosilane, and 750 ml. of ether. The refluxing was continued for 23 hours in this case. After the liquid portion was acidified, washed, dried, and rectified, a 60% yield of dimethylbis [4-chloro-3-(trifluoromethyl) phenyl]silane was obtained. This compound, although normally a solid at room temperature, is very easily supercooled. The liquid can be kept for many months at room temperature without crystallizing. At —78° C. the liquid forms a non-crystalline glass. The first crystals of this material were obtained by carefully purifying a redistilled sample by treating it with activated clay, thoroughly degassing the resulting liquid under vacuum, and allowing it to stand for several hours at room temperature. Subsequent batches were induced to crystallize by seeding the liquid with crystals from this preparation.

The following properties were determined for a purified sample of the dimethylbis [4-chloro-3-(trifluoromethyl) phenyl] silane:

| | | |
|---|---|---|
| B. P | | 326.2° C. |
| M. P | | 45.4° C. |
| $n_D^{25}$ | supercooled liquid | 1.5077 |
| $d_4^{25}$ | do | 1.3747 |

*Analysis.*—Calculated for $C_{16}H_{12}SiCl_2F_6$; Cl, 16.9; F, 27.2; Si, 6.7. Found: Cl, 16.59, 16.65; F, 27.9, 28.1; Si, 7.01, 6.99.

*Example 3.—Preparation of 4-chloro-3-(trifluoromethyl) phenyldimethylethoxysilane*

Two moles of 4-chloro-3-(trifluoromethyl)phenylmagnesium bromide was added with stirring and cooling (by use of an ice bath) to an ether solution of 3 moles of dimethyl diethoxysilane. After the addition was completed, the reaction mixture was stirred for three hours and then distilled. Ether and unreacted dimethyldiethoxysilane were removed at atmospheric pressure. The pressure was then reduced to 1–2 mm. of mercury and the desired silane was distilled at 65°–67° C.

*Analysis.*—Calculated for $C_{11}H_{14}ClF_3OSi$; Si, 9.91; Cl, 12.57; F, 20.18. Found: Si, 9.71; Cl, 12.74; F, 20.3.

*Example 4.—Preparation of bis-[4-chloro-3-(trifluoromethyl) phenyl] tetramethyldisiloxane*

200 cc. of 50% $H_2SO_4$ was added with stirring to 246 grams of 4-chloro-3-(trifluoromethyl) phenyldimethylethoxysilane. After stirring for two hours, cracked ice was added. The organic layer was separated, washed free of acid, dried with $Na_2SO_4$ and distilled. The resulting disiloxane boiled at 130°–131° C. at a pressure of 0.7 mm. of mercury and had a refractive index of $n_D^{25}$ 1.4838.

*Analysis.*—Calculated for $C_{18}H_{18}Cl_2F_6OSi_2$: Si, 11.45; Cl, 14.46; F, 23.22. Found: Si, 11.25; Cl, 14.61; F. 23.4.

*Example 5.—Preparation of 4-chloro-3-(trifluoromethyl) phenylmethyldiethoxysilane*

Two moles of 4-chloro-3-(trifluoromethyl)-phenylmagnesium bromide was added with stirring and cooling to 3 moles of methyltriethoxysilane in ether solution. Stirring was continued for 3 hours. The ether layer was decanted from the reaction flask into a distilling apparatus. After removing ether and unreacted methyltriethoxysilane at atmospheric pressure the reaction product was distilled under vacuum. There was obtained 261 grams of 4-chloro-3-(trifluoromethyl)-phenylmethyldiethoxysilane. The boiling point was 90° C. at a pressure of 4 mm. of mercury and the refractive index was $n_D^{25}$ 1.4518.

*Analysis.*—Calculated for $C_{12}H_{16}ClF_3O_2Si$: Cl, 11.36; Si, 8.91. Found: Cl, 11.35; Si, 8.76.

*Example 6.—Preparation of a silicone oil comprising 4-chloro-3-(trifluoromethyl) phenylmethylpolysiloxane end-blocked with trimethylsilyl groups*

In a reaction vessel 0.086 moles (0.17 equivalents of trimethylsilyl groups) of hexamethyldisiloxane was mixed with 0.515 moles of 4-chloro-3-(trifluoromethyl)-phenylmethyldiethoxysilane prepared as in Example 5. To this mixture was added, with stirring, 150 ml. of 75% $H_2SO_4$. Stirring was continued for three hours, after which crushed ice was added. This was followed by the addition of 100 ml. of benzene to aid in the separation of the organic layer. The benzene solution was washed free of acid, and dried over anhydrous $Na_2SO_4$. Benzene was evaporated from the filtered solution, giving a colorless, slightly cloudy, oily liquid.

*Example 7.—Preparation of bis-[4-chloro-3-(trifluoromethyl) phenyl]dichlorosilane*

Three moles of 4-chloro-3-(trifluoromethyl)-phenylmagnesium bromide was added with stirring to 5 moles of silicon tetrachloride while the reaction flask was immersed in a bath maintained at −20° C. The salts which precipitated were filtered off, and the filtrate was distilled, giving, besides ether and unreacted $SiCl_4$, 270 grams of material boiling at 35–60° C. at a pressure of 2 mm. of mercury and a 250 gram fraction having a boiling point of 125–135° C. at a pressure of 2 mm. of mercury. Rectification of this last fraction gave a product boiling at 112–115° C. at a pressure of 1 mm. of mercury, which on analysis was found to be bis[4-chloro-3-(trifluoromethyl) phenyl]dichlorosilane.

*Example 8.—Preparation of bis [4-chloro-3-(trifluoromethyl) phenyl] methylchlorosilane*

In a reaction vessel 0.6 mole of methylmagnesium chloride was added to an ether solution of 0.5 mole of bis[4-chloro-3-(trifluoromethyl) phenyl] dichlorosilane. When the reaction was completed, the salt precipitate was filtered off and the filtrate was distilled. After ether was removed there was obtained 171 grams of material which proved to be bis-[4-chloro-3-(trifluoromethyl) phenyl] methylchlorosilane. The calculated neutral equivalent (number of grams of sample which reacts with 1 mole of NaOH) is 437.5. The experimental value was found to be 441. The boiling point was 128–129° C. at a pressure of 1 mm. of mercury.

*Example 9.—Preparation of 1,3-dimethyltetrakis-[4-chloro-3-(trifluoromethyl) phenyl]disiloxane*

Bis-[4-chloro-3-(trifluoromethyl) phenyl]-methylchlorosilane dissolved in benzene was stirred for 6 hours in admixture with 85% $H_2SO_4$. Crushed ice was then stirred in. The benzene layer was separated, washed free of acid, and dried over anhydrous $Na_2SO_4$. It was then treated with activated clay, after which the benzene was evaporated. The product was a clear colorless oil. It was found to contain 17.12% chlorine. The calculated value is 17.31% chlorine for the product of the formula

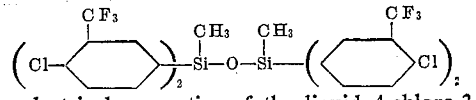

The electrical properties of the liquid 4-chloro-3-(trifluoromethyl) phenyltrimethylsilane as prepared in Example 1 were determined at 25° C., the dielectric constant at 60 cycles being 9.75 while the dissipation factor was 0.09%.

*Example 10.—Preparation of capacitors*

Capacitors were prepared from aluminum foil interleaved with three thicknesses of kraft paper which provided a total thickness of 1.2 mils of paper between the foils, and the capacitors were impregnated with the silane of Example 1. The power factor of the capacitors when tested with 60 cycle alternating current was 0.35% at 50° C., 0.55% at 100° C., and 1.47% at 130° C. The life of these capacitors when tested with direct current at 1200 volts was many times greater than with any known single dielectric liquid and was equal to the life of capacitors embodying the most stable combination of chlorinated diphenyl and anthraquinone known in the industry at the present time. By adding a stabilizer, such as anthraquinone, in the amount of 0.5% of the weight of the silane, the life of the capacitors of the present invention is increased by a factor of from 5 to 10. Kraft paper capacitors constructed in accordance with the present invention have a smaller volume for the same capacitance than chlorinated diphenyl capacitors. Furthermore, the capacitors of the present invention may be employed at temperatures of 100° C. to 140° C., which are far in excess of those that may be safely applied to chlorinated diphenyl or oil-impregnated capacitors.

The liquid dimethylbis [4-chloro-3-(trifluoromethyl) phenyl] silane of Example 2 was tested for its electrical properties, and the dielectric constant was found to be 10.35 and the dissipation factor 0.19% when tested with 60 cycle current at 25° C. Capacitors were prepared from the silane of Example 2 in a manner similar to that in Example 10, using the supercooled liquid, and when tested in the same way, they were found to have very similar properties, particularly the moderate increase in power factor with increases in temperature up to 130° C.

Dimethylbis[4-chloro - 3 - (trifluoromethyl) phenyl]-silane can be handled easily as a liquid at room temperature, with very little probability of its crystallizing. However, the liquids used as capacitor fluids are likely to be subjected to a wide range of temperatures and electrical stresses, and it is desirable to use liquids which are incapable of crystallizing under any conditions to be encountered. Mixtures of dimethylbis[4-chloro-3-trifluoromethyl)phenyl]silane and 4-chloro-3-trifluoromethyl) phenyl-trimethylsilane were investigated. It was found that these compounds form a eutectic mixture at a composition of about 90% 4-chloro-3-(trifluoromethyl) phenyltrimethylsilane and 10% dimethylbis-[4-chloro-3-(trifluoromethyl)phenyl]silane. The true melting point of the eutectic mixture was estimated by extrapolation to be about −41° C. All efforts to induce crystallization failed. Even when seed crystals of both compounds were added and the mixture was agitated vigorously for several hours at temperatures ranging from −35 to −78° C., there was neither visual nor thermal evidence of crystallization. Freezing points of a series of mixtures of these two silanes are shown in the following table:

TABLE I

| Wt. Percent 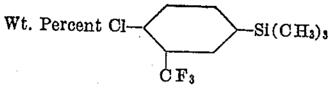 | M. P., ° C. |
|---|---|
| 100 | −34.1. |
| 98.99 | −36.0. |
| 97.34 | −37. |
| 91.82 | −41. |
| 89.90 | −40. |
| 82.03 | would not crystallize. |
| 71.27 | Do. |
| 60.54 | 10. |
| 51.75 | 15.3. |
| 36.98 | 24.9. |
| 27.41 | 30.5. |
| 14.44 | 37.9. |
| 5.31 | 42.8. |
| 0 | 45.4. |

The temperatures given are those at which an extremely small quantity of solid was in equilibrium with a large quantity of liquid. The actual lower limit of practical operation of capacitors would be considerably below these temperatures. It can be seen that the mixtures containing from 70 to 99% of 4-chloro-3-(trifluoromethyl) phenyltrimethylsilane have particularly good low temperature properties. An even further reduction in freezing point can be obtained by admixing one or more additional silanes.

The electrical properties of the mixtures are generally intermediate between those of the two components, as shown in the following table in which all proportions are by weight and where I represents

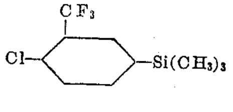

and II represents

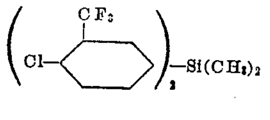

TABLE II

| | 100% I | 100% II | 72% I, 28% II |
|---|---|---|---|
| Diel. Const., 25° C.: | | | |
| 60 cy | 9.75 | [1] 10.35 | 10.1 |
| 1,000 cy | 9.75 | [1] 10.35 | 10.1 |
| Diel. Const., 85° C.: | | | |
| 60 cy | 7.94 | 8.78 | 8.44 |
| 1,000 cy | 7.94 | 8.76 | 8.44 |
| 100×tan δ 25° C.: | | | |
| 60 cy | .09 | [1] .19 | .24 |
| 1,000 cy | .01 | [1] .02 | .01 |
| 100×tan δ 85° C.: | | | |
| 60 cy | .59 | .70 | .37 |
| 1,000 cy | .05 | .06 | .02 |

[1] Measurements made on supercooled liquid.

The bis- [4-chloro- 3- (trifluoromethyl)phenyl] tetramethyldisiloxane of Example 4 was tested with alternating electrical current at frequencies of 60 cycles and 1000 cycles per second at 25° C., and in both cases the dielectric constant was 11.25. The power factor at 60 cycles was 0.11% while at 1000 cycles it was 0.01%. Capacitors were prepared in the manner described in Example 10 using the disiloxane of Example 4 as the liquid impregnant. Upon testing they were found to have a small increase in power factor with temperature rise up to temperatures of 125° C.

The siloxane of Example 6 was tested and found to have the following properties:

TABLE III

| Temperature | Dielectric Constant | Power Factor, Percent |
|---|---|---|
| 25° C.: | | |
| 60 cycles | 11.4 | 0.03 |
| 1,000 cycles | 11.4 | 0.04 |
| 85° C.: | | |
| 60 cycles | 9.46 | 2.95 |
| 1,000 cycles | 9.46 | 0.19 |

The disiloxane of Example 9 was tested electrically and its dielectric constant was 10.4 at both 60 cycles and 1 kilocycle at 25° C. The power factor at 25° C. was 1.49% at 60 cycles and 0.11% at 1 kilocycle.

It will be appreciated that mixtures of two or more siloxanes and silanes may be effected, as indicated in previous examples. Mixtures embodying compositions of the present invention have high dielectric constants of about 10 at 60 cycles at 25° C., and low power factors when employed in electrical devices. Low freezing points are a desirable characteristic of such mixtures.

The compositions of the present invention may be combined with stabilizers which are employed at the present time in combination with chlorinated aryl dielectric liquids such as chlorinated diphenyls. Examples of these stabilizers are quinones, such as anthraquinone, benzil, azo compounds, as azobenzene and azoxybenzene, and dinitrobenzil. They may be added in amounts of from 0.1% to 1% by weight of the organosilicon compounds, or more. A number of these stabilizers are set forth in the article entitled "Stabilization of chlorinated diphenyl in paper capacitors" on page 117 of the January 1948 issue of Industrial and Engineering Chemistry.

Referring to the drawing, there is illustrated a capacitor 10 comprising a casing 12 provided with a cover 14. Within the casing 12 are disposed metal foils or electrodes 16 separated by sheet insulation 18 such as paper, inversed in a liquid dielectric 20 comprising the chlorotrifluoromethylphenyl silicon compounds of this invention. A lead 22 connected to one of the metal electrodes 16 is attached to one bushing 24 passing through the cover 14.

It will be appreciated that the liquid organosilicon compounds of the present invention may be employed in capacitors embodying paper, glass fiber mat or paper, synthetic resin papers or fibers and other separators. In some cases no solid dielectric need be present between the capacitor electrodes, with only the liquid compositions of this invention, with or without stabilizers, being present as the dielectric medium.

While it has been indicated herein that the compositions of the present invention have unusual electrical properties rendering them most useful for electrical applications, such as in capacitors, they also have utility as lubricants, pressure transmitting media and electrical insulating liquids in transformers and cables. The following table sets forth the lubricating properties of the organosilicon compounds of this invention and also that of a standard dimethyl silicone oil.

TABLE IV

| Compound | Coefficient of Friction | Falex Test Average Wear Steel on Steel Units Per Hour (100# Ga. Pres.) |
|---|---|---|
| Silane of Example 1 | 0.18 | 9.6 |
| Silane of Example 2 | ---------- | 3.6 |
| Siloxane of Example 4 | 0.14 | 2.6 |
| Siloxane of Example 6 | 0.145 | 0.33 |
| Disiloxane of Example 9 | ---------- | 2.0 |
| Dimethyl silicone oil (100 centistokes) | 0.33 | 3,600 |

It will be understood that the matter set forth herein is exemplary and not limiting.

We claim as our invention:

1. An organosilicon compound comprising only the group

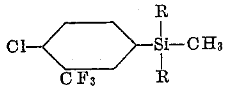

wherein R is a radical selected from the group consisting of methyl, 4-chloro-3-(trifluoromethyl) phenyl and oxygen.

2. A silane having the formula

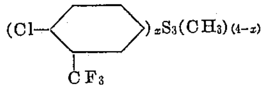

where $x$ is an integer having a value of from 1 to 2.

3. A liquid siloxane having the group

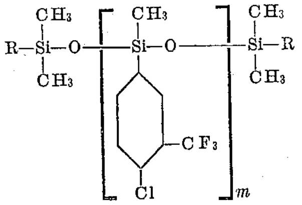

where $m$ has a whole value of at least 1 and R is an organic radical selected from the group consisting of methyl and 4-chloro-3-trifluoromethylphenyl radicals.

4. A liquid disiloxane having the formula

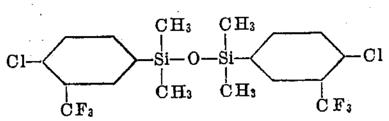

5. A liquid siloxane comprising only the recurring group

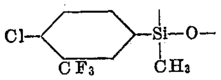

and having no other substituents directly attached to the silicon atoms in the siloxane other than those attached to silicon in the group.

6. A liquid polysiloxane having the structural formula

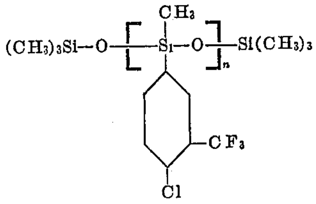

where $n$ is an integer with a value of at least one.

7. A liquid disiloxane having the formula

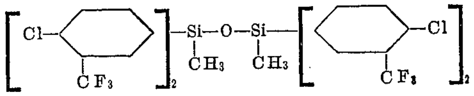

References Cited in the file of this patent

UNITED STATES PATENTS

| | | |
|---|---|---|
| 2,377,689 | Hyde | June 5, 1945 |
| 2,389,802 | McGregor | Nov. 27, 1945 |
| 2,389,804 | McGregor | Nov. 27, 1945 |
| 2,530,202 | Kohl | Nov. 14, 1950 |
| 2,571,090 | Kohl | Oct. 16, 1951 |
| 2,590,650 | Robinson | Mar. 25, 1952 |
| 2,636,896 | Frost | Apr. 29, 1953 |
| 2,640,063 | Kohl | May 26, 1953 |

OTHER REFERENCES

"Stabilization of chlorinated diphenyl in paper capacitors," by T. J. Berberich et al., Industrial and Engineering Chemistry, vol. 40, pages 117 and 118, January 1948.